(12) United States Patent
Buendgen et al.

(10) Patent No.: US 9,563,753 B1
(45) Date of Patent: *Feb. 7, 2017

(54) METHOD FOR BOOTING AND DUMPING A CONFIDENTIAL IMAGE ON A TRUSTED COMPUTER SYSTEM

(71) Applicant: International Business Machines Corporation, Armonk, NY (US)

(72) Inventors: Reinhard T. Buendgen, Tuebingen (DE); James A. O'Connor, Ulster Park, NY (US); William J. Rooney, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/205,485

(22) Filed: Jul. 8, 2016

Related U.S. Application Data

(63) Continuation of application No. 15/071,312, filed on Mar. 16, 2016, which is a continuation of application
(Continued)

(51) Int. Cl.
*G06F 12/14* (2006.01)
*G06F 21/62* (2013.01)
(Continued)

(52) U.S. Cl.
CPC .......... *G06F 21/121* (2013.01); *G06F 9/4406* (2013.01); *G06F 9/4416* (2013.01); *G06F 21/572* (2013.01);
(Continued)

(58) Field of Classification Search
CPC .... H04L 63/0428; H04L 63/0442; H04L 9/08; H04L 9/0825; G06F 21/57; G06F 21/572; G06F 21/60; G06F 21/62; G06F 9/45533; G06F 12/14
See application file for complete search history.

(56) References Cited

U.S. PATENT DOCUMENTS 6,182,222 B1 * 1/2001 Oparaji ............... G06F 21/6209
726/17
7,299,354 B2 11/2007 Khanna et al.
(Continued)

OTHER PUBLICATIONS

Irza et al., "A third generation many-core processor for secure embedded computing systems," High Performance Extreme Computing (HPEC), 2012 IEEE Conference on Year: 2012, pp. 1-3.
(Continued)

*Primary Examiner* — Linglan Edwards
(74) *Attorney, Agent, or Firm* — Edward P. Li

(57) ABSTRACT

A computer system for dumping a confidential image on a trusted computer system. A trusted computer system loads an encrypted client dumper image key. The trusted computer system decrypts, with a private host key, the encrypted client dumper image key to generate a client dumper image key. The trusted computer system loads an encrypted dumper including a client dump key, in response to determining that the client dumper image key matches a client image key which encrypts a boot image of a current operating system. The trusted computer system decrypts, with the client dumper image key, the encrypted dumper to generate a dumper including the client dump key. The trusted computer system starts the dumper. The dumper generates an encrypted dump by encrypting, with the client dump key, an image to be dumped in the secure logical partition, and the dumper writes the encrypted dump on a client dump device.

1 Claim, 7 Drawing Sheets

Related U.S. Application Data

No. 15/071,303, filed on Mar. 16, 2016, now Pat. No. 9,454,662, which is a continuation of application No. 14/884,819, filed on Oct. 16, 2015.

(51) Int. Cl.
| | |
|---|---|
| *G06F 21/12* | (2013.01) |
| *G06F 9/44* | (2006.01) |
| *G06F 21/60* | (2013.01) |
| *G06F 21/57* | (2013.01) |
| *H04L 9/14* | (2006.01) |

(52) U.S. Cl.
CPC ............... *G06F 21/602* (2013.01); *H04L 9/14* (2013.01); *G06F 2221/2107* (2013.01)

(56) References Cited

U.S. PATENT DOCUMENTS

| | | | |
|---|---|---|---|
| 7,543,150 B2 * | 6/2009 | Kudo | G06F 21/575 713/176 |
| 8,839,004 B1 | 9/2014 | Bennett et al. | |
| 8,856,504 B2 | 10/2014 | Maino et al. | |
| 8,868,908 B2 * | 10/2014 | MacMillan | G06F 21/53 713/164 |
| 8,914,627 B2 | 12/2014 | Park et al. | |
| 8,918,653 B2 | 12/2014 | Buswell | |
| 8,984,610 B2 * | 3/2015 | Spiers | H04L 63/0218 726/22 |
| 9,454,662 B1 | 9/2016 | Buendgen et al. | |
| 2005/0138409 A1 | 6/2005 | Sheriff et al. | |
| 2005/0149729 A1 | 7/2005 | Zimmer et al. | |
| 2008/0016576 A1 | 1/2008 | Ueda et al. | |
| 2009/0327750 A1 * | 12/2009 | Wu | G06F 12/1416 713/189 |
| 2011/0296201 A1 | 12/2011 | Monclus et al. | |
| 2011/0302400 A1 | 12/2011 | Maino et al. | |
| 2012/0102333 A1 | 4/2012 | Wong | |
| 2012/0185683 A1 | 7/2012 | Krstic et al. | |
| 2012/0210115 A1 | 8/2012 | Park et al. | |
| 2013/0318363 A1 * | 11/2013 | Wu | G06F 12/1416 713/193 |
| 2014/0208097 A1 | 7/2014 | Brandwine et al. | |
| 2014/0331309 A1 | 11/2014 | Spiers et al. | |
| 2014/0380035 A1 | 12/2014 | Marinelli et al. | |
| 2015/0074392 A1 * | 3/2015 | Boivie | G06F 21/602 713/164 |
| 2015/0113240 A1 * | 4/2015 | Abrams | G06F 12/1458 711/163 |
| 2015/0113242 A1 * | 4/2015 | Abrams | G06F 12/1458 711/163 |
| 2015/0113278 A1 * | 4/2015 | Cocchi | G06F 21/575 713/171 |
| 2015/0186203 A1 * | 7/2015 | Goyal | G06F 11/0778 714/45 |
| 2015/0254451 A1 | 9/2015 | Doane et al. | |
| 2016/0089607 A1 | 3/2016 | Ike et al. | |
| 2016/0148001 A1 * | 5/2016 | Bacher | G06F 9/45558 713/189 |

OTHER PUBLICATIONS

Rad et al., "A novel image encryption method to reduce decryption execution time in cloud," Systems Conference (Syscon), 2015 9th Annual IEEE International Year: 2015, pp. 478-482.

Szefer et al., "Architectural Support for Hypervisor-Secure Virtualization", ASPLOS'12, Mar. 3-7, 2012, London, England, UK, Copyright © 2012 ACM, pp. 1-13.

"Self Detection and Correction Method for Handling Multiple Boot Images", An IP.com Prior Art Database Technical Disclosure, IP.com No. IPCOM000199557D, IP.com Electronic Publication: Sep. 9, 2010, pp. 1-4.

Buendgen et al., "System for Booting and Dumping a Confidential Image on a Trusted Computer System", U.S. Appl. No. 15/192,033, filed Jun. 24, 2016, pp. 1-19.

Buendgen et al., "Method for Booting and Dumping a Confidential Image on a Trusted Computer System", U.S. Appl. No. 15/071,312, filed Mar. 16, 2016, pp. 1-19.

Buendgen et al., "Method for Booting and Dumping a Confidential Image on a Trusted Computer System", U.S. Appl. No. 14/884,819, filed Oct. 16, 2015, pp. 1-23.

IBM Appendix P.: "List of IBM Patents or Patent Applications to be Treated as Related", dated Sep. 29, 2016, 2 pages.

\* cited by examiner

METHOD FOR BOOTING AND DUMPING A CONFIDENTIAL IMAGE ON A TRUSTED COMPUTER SYSTEM

TECHNICAL FIELD OF THE INVENTION

The present invention relates generally to security in a cloud computing environment, and more particularly to booting and dumping a confidential image on a trusted computer system.

BACKGROUND

A trusted computer system has a defined and verifiable function, shrouds the memory used by the system from inspection, has access to a private key that uniquely identifies the system, cannot be inspected from outside the system or any software running inside the system, and runs secure firmware that cannot be inspected or modified either from outside the trusted computer system or from software running in the trusted computer system. On a trusted computer system, the secure firmware has access to the private key of the trusted computer system.

A confidential image can be deployed to the trusted computer system. With the confidential image deployed to the trusted computer system, any party who inspects storage outside the trusted system cannot learn the contents of the confidential image, any party who inspects communication channels used for deploying the confidential image to the trusted computer system cannot learn the contents of the image.

A standalone dump mechanism can dump an operating system image, anytime and regardless of the state of the operating system, to a dump medium, provided the system is capable of booting an image. A confidential standalone dump image must ensure that the contents of dumped image can only be observed by the owner of the dumped image.

SUMMARY

A computer system for dumping a confidential image on a trusted computer system is provided. The computer system comprises one or more processors, one or more computer readable tangible storage devices, and program instructions stored on at least one of the one or more computer readable tangible storage devices for execution by at least one of the one or more processors. The program instructions are executable to load, by the trusted computer system, an encrypted client dumper image key onto a protected area on the trusted computer system. The program instructions are executable to decrypt, by the trusted computer system and with a private host key stored in the protected area, the encrypted client dumper image key to generate a client dumper image key in the protected area. The program instructions are executable to compare, by the trusted computer system, the client dumper image key with a client image key in the protected area. The program instructions are executable to determine, by the trusted computer system, whether the client dumper image key matches the client image key. The program instructions are executable to load, by the trusted computer system, an encrypted dumper including a client dump key onto a secure logical partition on the trusted computer system, in response to determining that the client dumper image key matches the client image key. The program instructions are executable to decrypt, by the trusted computer system and with the client dumper image key, the encrypted dumper to generate a dumper including the client dump key. The program instructions are executable to start, by the trusted computer system, the dumper. The program instructions are executable to generate, by the dumper and with the client dump key, an encrypted dump by encrypting an image to be dumped in the secure logical partition. The program instructions are executable to write, by the dumper, the encrypted dump on a client dump device. The protected area is in secure firmware of the trusted computer system, inaccessible by any program outside the secure firmware, inaccessible by an operating system, and inaccessible by a user. The client image key in the protected area is used to encrypt a boot image of a current operating system stored in the secure logical partition on the trusted computer system. The encrypted client dumper image key is generated by a client computer, with a public host key. The encrypted dumper is generated by the client computer, with the client dumper image key. The dumper is stored in an area of the secure logical partition which is reserved for the dumper.

DETAILED DESCRIPTION

Embodiments of the present invention disclose a mechanism of deploying a secure boot image and encrypted client data from a client to a trusted computer system. Embodiments of the present invention disclose a mechanism of booting a confidential image on a trusted computer system. Embodiments of the present invention also disclose a mechanism of a guest initiated confidential standalone dump of an operating system image.

Figure 1:
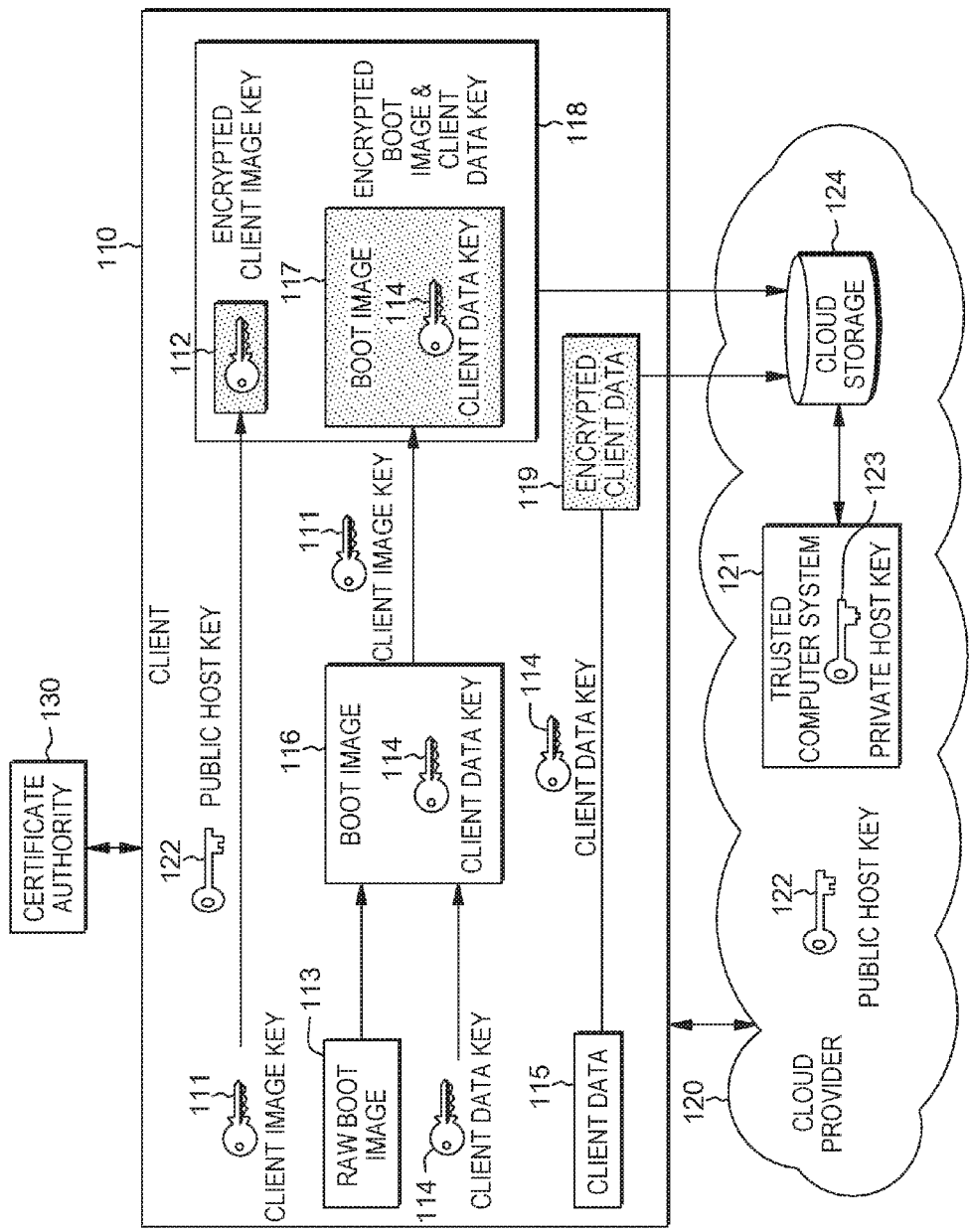
FIG. 1 is a systematic diagram showing deployment of a secure boot image and encrypted client data from a client to a cloud provider, in accordance with one embodiment of the present invention.

FIG. 1 is a systematic diagram showing deployment of secure boot image 118 and encrypted client data 119 from client 110 to cloud provider 120, in accordance with one embodiment of the present invention. The system comprises client 110 and cloud provider 120. Cloud provider 120 comprises trusted computer system 121 and cloud storage 124. Trusted computer system 121 is equipped with private host key 123 which is a non-forgeable and non-extractable private key. Public host key 122, which is a public key of an asymmetric key pair and corresponds to private host key 123, is managed by provider 120.

Referring to FIG. 1, client 110 receives public host key 122 from cloud provider 120 and authenticates public host key 122 through certificate authority 130. Certificate authority 130 may be a vendor of trusted computer server 121. Client 110 generates two symmetric keys only known to client 110: client image key 111 and client data key 114. Client 110 uses client data key 114 to encrypt client data 115 and generate encrypted client data 119. Client 110 writes client data key 114 into raw boot image 113 to generate boot image 116 which comprises raw boot image 113 and client data key 114. Client 110 uses client image key 111 to encrypt boot image 116 and generate encrypted boot image 117. Client 110 uses authenticated public host key 122 to encrypt client image key 111 and generates encrypted client image key 112. Thus, secure boot image 118 is generated by client 110, and it includes encrypted client image key 112 and encrypted boot image 117 (which includes raw boot image 113 and client data key 114). Client 110 deploys secure boot image 118 and encrypted client data 119 to cloud storage 124.

Figure 2:
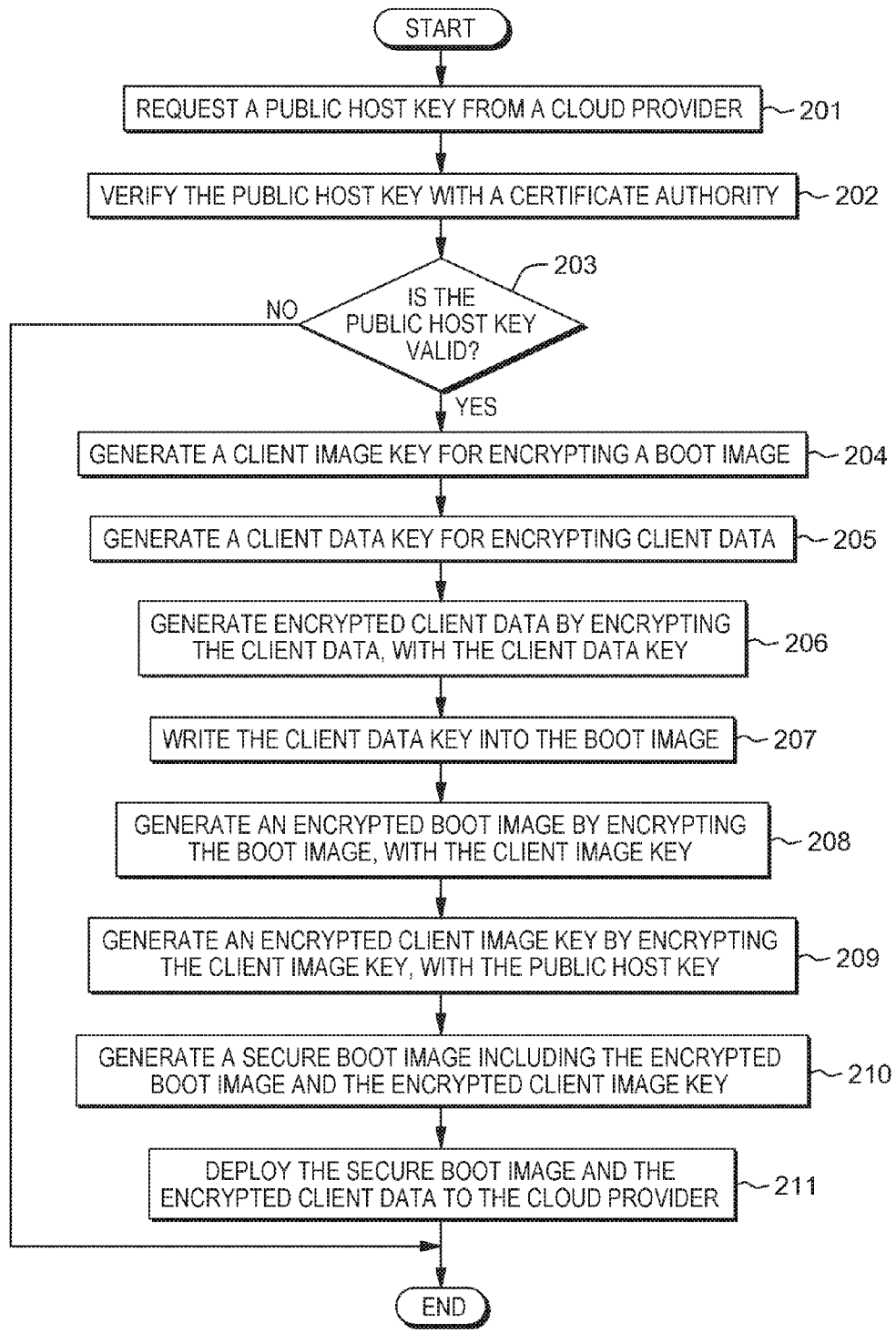
FIG. 2 is a flowchart showing operational steps for a client to generate and deploy a secure boot image and encrypted client data, in accordance with one embodiment of the present invention.

FIG. 2 is a flowchart showing operational steps for client 110 to generate and deploy secure boot image 118 and encrypted client data 119, in accordance with one embodiment of the present invention. At step 201, client 110 requests public host key 122 from cloud provider 120. Public host key 122 is managed by cloud provider 120; it is a public key of an asymmetric key pair and corresponds to private host key 123 kept by trusted computer system 121. At step 201, client 110 verifies public host key 122 with certificate authority 130. At step 203, client 110 determines whether public host key 122 is a valid key. In response to determining that public host key 122 is not a valid key, client 110 aborts the process of generating and deploying secure boot image 118 and encrypted client data 119.

In response to determining that public host key 122 is a valid key, client 110 at step 204 generates client image key 111 for encrypting a boot image. Client image key 111 is a symmetric key. At step 205, client 110 generates client data key 114 for encrypting client data. Client data key 114 is also a symmetric key. At step 206, client 110 generates encrypted client data 119, by encrypting client data 115 with client data key 114. At step 207, client 110 writes client data key 114 into raw boot image 113. At this step, client 110 generates boot image 116 which comprises raw boot image 113 and client data key 114. At step 208, client 110 generates encrypted boot image 117 by encrypting boot image 116 with client image key 111. At step 209, client 110 generates encrypted client image key 112 by encrypting client image key 111 with public host key 122. At step 210, client 110 generates secure boot image 118 including encrypted boot image 117 and encrypted client image key 112. At step 211, client 110 deploys secure boot image 118 and encrypted client data 119 to cloud provider 120.

Figure 3:
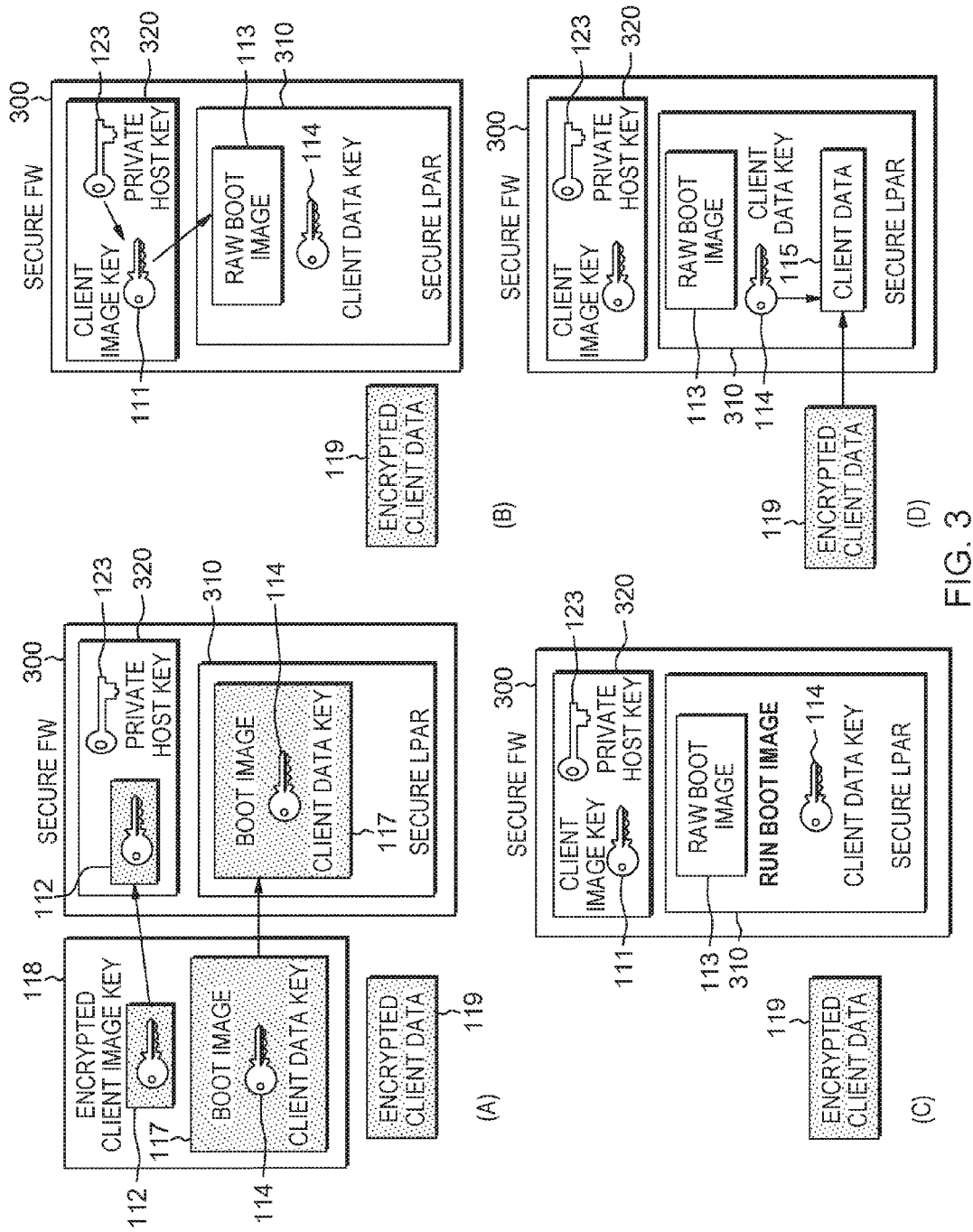
FIG. 3 is a systematic diagram showing Initial Program Load (IPL) of a secure boot image by a secure firmware on a trusted computer system, in accordance with one embodiment of the present invention.

FIG. 3 is a systematic diagram showing Initial Program Load (IPL) of secure boot image 118 by secure firmware 300 on trusted computer system 121, in accordance with one embodiment of the present invention. Secure firmware 300 comprises protected area 320 and secure logical partition (LPAR) 310. Protected area 320 is inaccessible by a normal program or an operating system running in secure LPAR 310, by code running in another LPAR, or by an operator or user. Private host key 123 resides in protected area 320. Shown in (A) of FIG. 3, secure firmware 300 loads encrypted client image key 112 onto protected area 320 and encrypted boot image 117 onto secure LPAR 310. Shown in (B) of FIG. 3, secure firmware 300 uses private host key 123 to decrypt encrypted client image key 112 and thus obtains client image key 111 in protected area 320. Then, secure firmware 300 uses client image key 111 to decrypt encrypted boot image 117 and thus obtains raw boot image 113 and client data key 114 in secure LPAR 310. Shown in (C) of FIG. 3, secure firmware 300 starts to run raw boot image 113. Shown in (D) of FIG. 3, raw boot image 113 mounts encrypted client data 119 and uses client data key 114 to decrypt encrypted client data 119.

Figure 4:
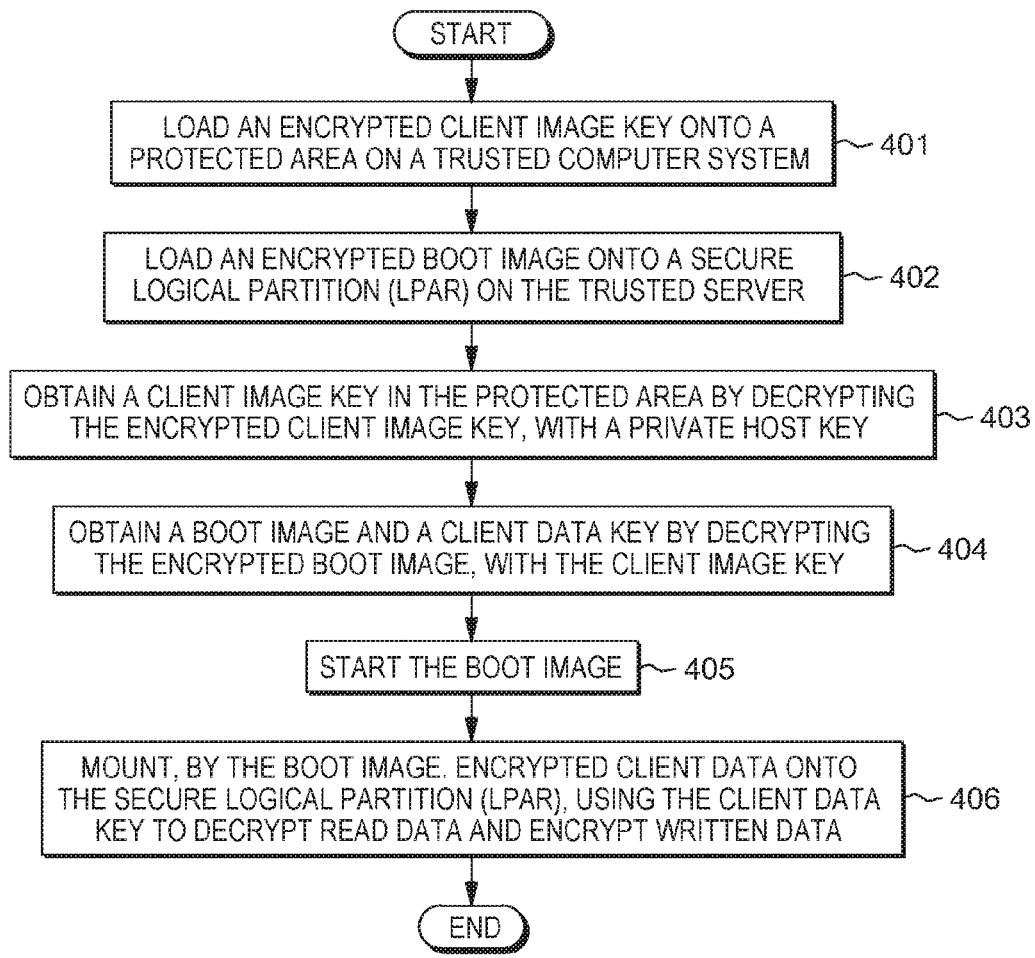
FIG. 4 is a flowchart showing operational steps for Initial Program Load (IPL) of a secure boot image by a secure firmware on a trusted computer system, in accordance with one embodiment of the present invention.

FIG. 4 is a flowchart showing operational steps for Initial Program Load (IPL) of secure boot image 118 by secure firmware 300 on trusted computer system 120, in accordance with one embodiment of the present invention. At step 401, secure firmware 300 loads encrypted client image key 112 onto protected area 320. At step 402, secure firmware 300 loads encrypted boot image 117 into secure LPAR 310. At step 403, using private host key 123 to decrypt encrypted client image key 112, secure firmware 300 obtains client image key 111 in protected area 320. At step 404, using client image key 111 to decrypt encrypted boot image 117, secure firmware 300 obtains raw boot image 113 and client data key 114. At step 405, secure firmware 300 starts raw boot image 113. At this step, secure firmware 300 transfers the control to the decrypted boot image—raw boot image 113. At step 406, raw boot image 113 mounts encrypted client data 119 onto secure LPAR 310. At this step, raw boot image 113 uses client data key 114 to decrypt encrypted client data 119 to obtain client data 115. Raw boot image 113 uses client data key 114 to decrypt read data and encrypt written data.

Figure 5:
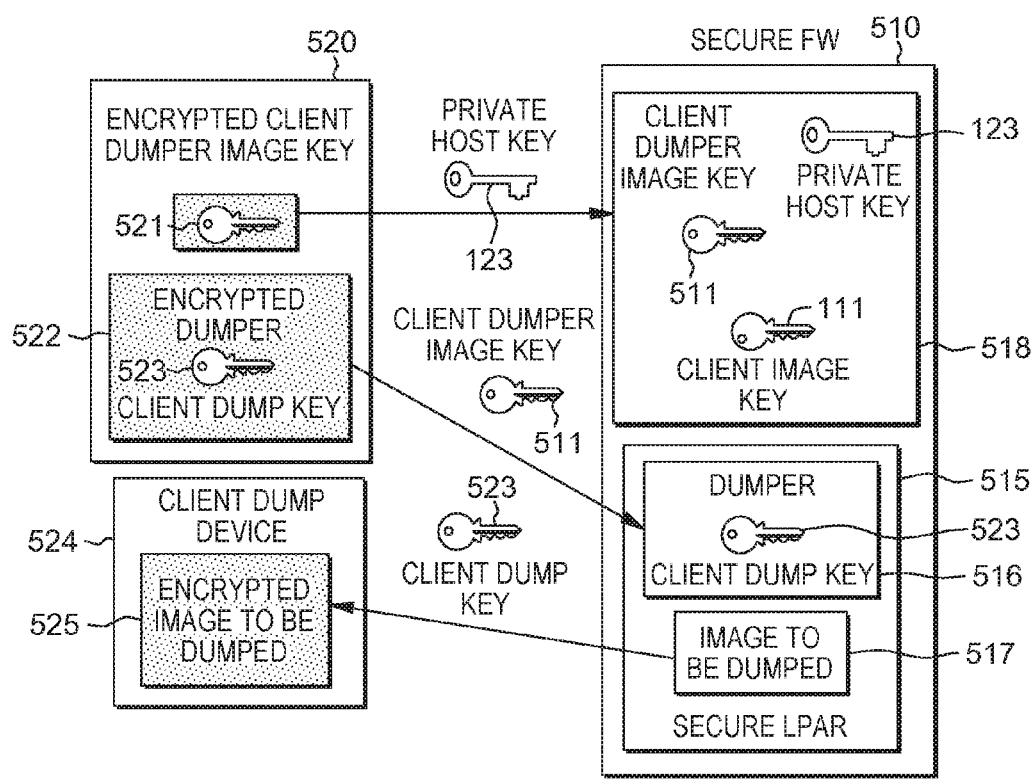
FIG. 5 is a systematic diagram showing a guest initiated confidential standalone dump of a current operating system image, in accordance with one embodiment of the present invention.

FIG. 5 is a systematic diagram showing a guest initiated confidential standalone dump of a current operating system image, in accordance with one embodiment of the present invention. Secure dumper image 520 comprises encrypted client dumper image key 521 and encrypted dumper 522. Encrypted client dumper image key 521 has been generated from client dumper image key 511 by client 110, with public host key 122 shown in FIG. 1. Encrypted dumper 522 has been generated by client 110, with client dumper image key 511. Encrypted dumper 522 comprises client dump key 523. Secure firmware 510 comprises protected area 518 and secure logical partition (LPAR) 515. Protected area 518 is inaccessible by a normal program or an operating system running in secure LPAR 515, or by an operator or user. When a user on trusted computer system 121 initiates a confidential standalone dump process, encrypted client dumper image key 521 is loaded onto protected area 518 and decrypted with private host key 123 which resides in protected area 518. Through decryption of encrypted client dumper image key 521, client dumper image key 511 is generated in protected area 518. Client dumper image key 511 is compared to client image key 111 which resides in protected area 518. Client image key 111 has been used to encrypting (as shown in FIGS. 1 and 2) raw boot image 113 of the current operating system. If client dumper image key 511 matches client image key 111, encrypted dumper 522 is loaded onto an unused area of secure LPAR 515 and decrypted with client dumper image key 511; thus, dumper 516 including client dump key 523 is generated in secure LPAR 515. The unused area is reserved for dumper 515. Image to be dumped 517 is encrypted with client dump key 523 to generate encrypted image to be dumped 525 which is written on client dump device 524. In another embodiment, client dump key 523 may be included in encrypted client dumper image key 521; after encrypted client dumper image key 521 is decrypted by private host key 123, client dump key 523 is included in client dumper image key 511.

Figure 6:
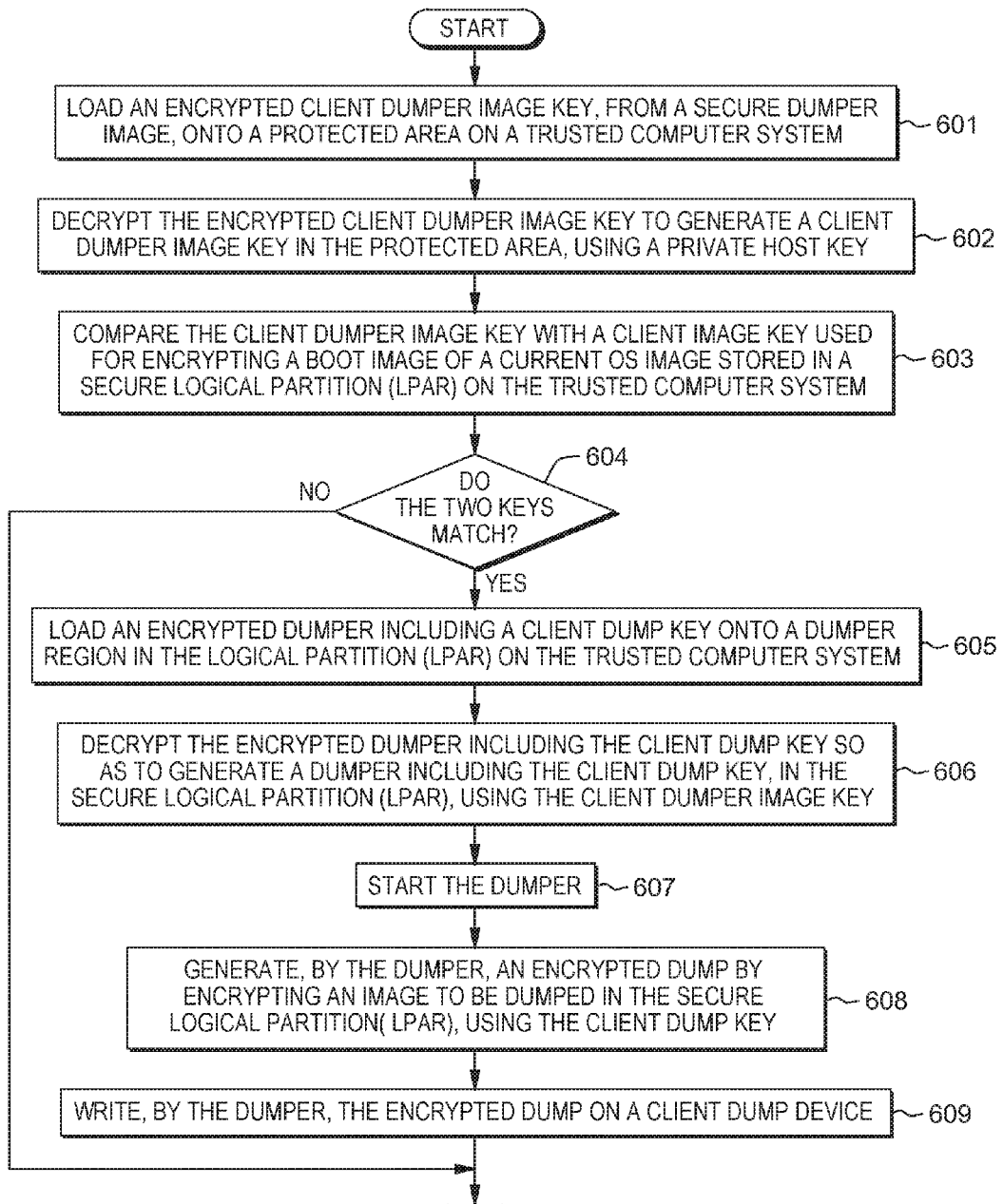
FIG. 6 is a flowchart showing operational steps for a confidential standalone dump of a current operating system image, in accordance with one embodiment of the present invention.

FIG. 6 is a flowchart showing operational steps for a confidential standalone dump of a current operating system image, in accordance with one embodiment of the present invention. At step 601, in response to receiving a request for a confidential standalone dump process initiated by a user, secure firmware 510 on trusted computer system 121 loads encrypted client dumper image key 521 from secure dumper image 520 onto protected area 518 of secure firmware 510 on trusted computer system 121. Secure dumper image 520 has been generated by a client computer such as client 110 shown in FIG. 1. Encrypted client dumper image key 521 has been generated by the client computer with a public host key such as public host key 122 shown in FIG. 1. At step 602, secure firmware 510 on trusted computer system 121 decrypts, using private host key 123 stored in protected area 518, encrypted client dumper image key 521 to generate client dumper image key 511 in protected area 518. Private host key 123 is a private key of an asymmetric key pair and corresponds to public host key 122. At step 603, secure firmware 510 on trusted computer system 121 compares client dumper image key 511 with client image key 111 stored in protected area 518. Client image key 111 has been used to encrypt a boot image (such as raw boot image 113 shown in FIG. 1) of a current operating system. The current operating image is stored in secure LPAR 515. At step 604, secure firmware 510 on trusted computer system 121 determines whether client dumper image key 511 matches client image key 111.

In response to determining that client dumper image key 511 does not match client image key 111, secure firmware 510 on trusted computer system 121 aborts the confidential standalone dump process. In response to determining that client dumper image key 511 matches client image key 111, secure firmware 510 on trusted computer system 121 at step 605 loads encrypted dumper 522 onto a dumper region in secure LPAR 515. Encrypted dumper 522 comprises client dump key 523. Encrypted dumper 522 has been generated by a client computer such as client 110 shown in FIG. 1, and it has been generated with client dumper image key 511. At step 606, secure firmware 510 on trusted computer system 121 decrypts, using client dumper image key 511, encrypted dumper 522 so as to generate dumper 516, which includes client dump key 523, in the dumper region in secure LPAR 515. At step 607, secure firmware 510 on trusted computer system 121 starts dumper 516. At this step, secure firmware 510 on trusted computer system 121 transfers the control to dumper 516. At step 608, dumper 516 generates an encrypted dump (encrypted image to be dumped 525) in secure LPAR 515, by encrypting image to be dumped 517 with client dump key 523. At step 609, dumper 516 writes the encrypted dump (encrypted image to be dumped 525) on client dump device 524.

Figure 7:
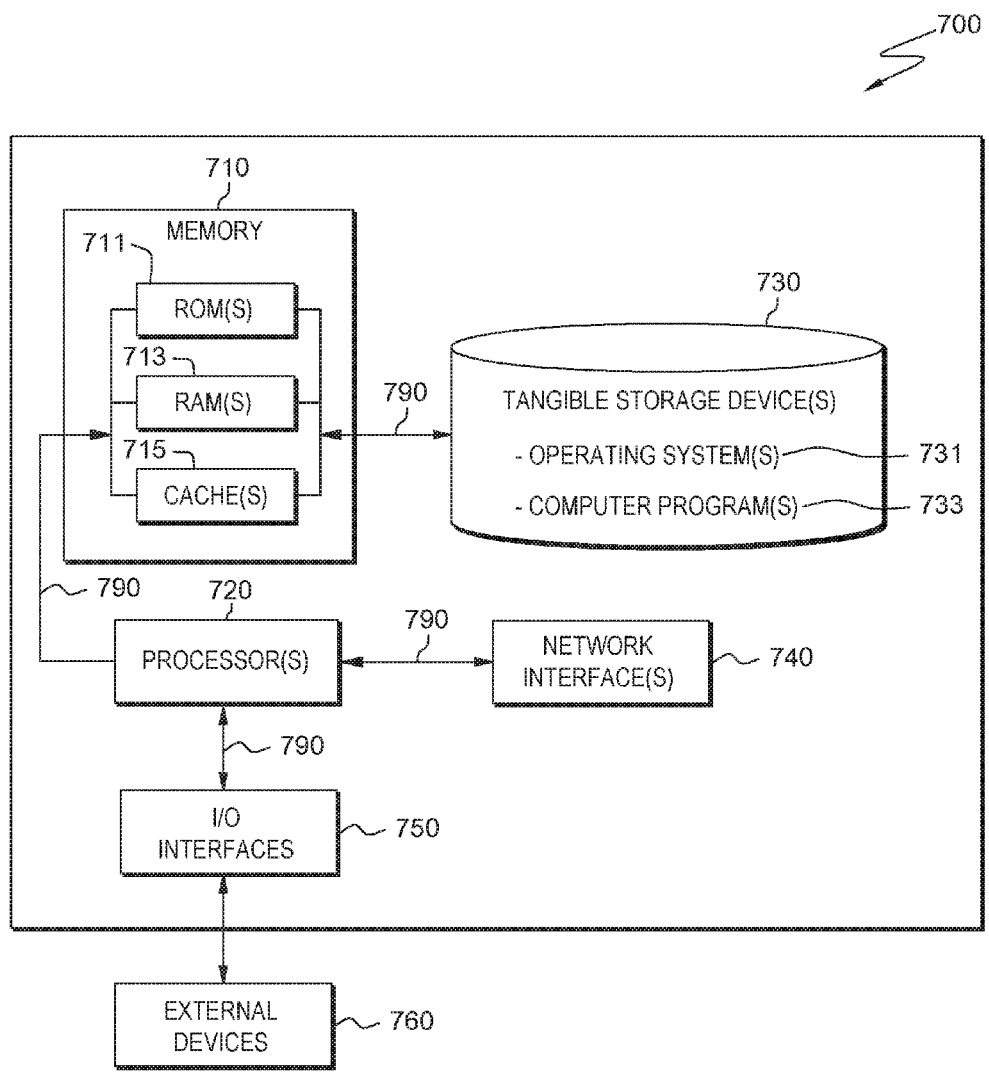
FIG. 7 is a diagram illustrating components of a client computer device, a cloud provider computer device, or a trusted computer system, in accordance with one embodiment of the present invention.

FIG. 7 is a diagram illustrating components of a computer device of client 110, a computer device of cloud provider 120, or trusted computer system 121, in accordance with one embodiment of the present invention. It should be appreciated that FIG. 7 provides only an illustration of one implementation and does not imply any limitations with regard to the environment in which different embodiments may be implemented.

Referring to FIG. 7, computer device 700 includes processor(s) 720, memory 710, and tangible storage device(s) 730. In FIG. 7, communications among the above-mentioned components of computer device 700 are denoted by numeral 790. Memory 710 includes ROM(s) (Read Only Memory) 711, RAM(s) (Random Access Memory) 713, and cache(s) 715. One or more operating systems 731 and one or more computer programs 733 reside on one or more computer readable tangible storage device(s) 730. Computer device 700 further includes I/O interface(s) 750. I/O interface(s) 750 allows for input and output of data with external device(s) 760 that may be connected to computer device 700. Computer device 700 further includes network interface(s) 740 for communications between computer device 700 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for dumping a confidential image on a trusted computer system, the computer system comprising one or more processors, one or more computer readable tangible storage devices, and program instructions stored on at least one of the one or more computer readable tangible storage devices for execution by at least one of the one or more processors, the program instructions executable to:

load, by the trusted computer system, an encrypted client dumper image key onto a protected area on the trusted computer system;

decrypt, by the trusted computer system, the encrypted client dumper image key to generate a client dumper image key in the protected area, with a private host key stored in the protected area;

compare, by the trusted computer system, the client dumper image key with a client image key in the protected area;

determine, by the trusted computer system, whether the client dumper image key matches the client image key;

load, by the trusted computer system, an encrypted dumper including a client dump key onto a secure logical partition on the trusted computer system, in response to determining that the client dumper image key matches the client image key;

decrypt, by the trusted computer system, with the client dumper image key, the encrypted dumper to generate a dumper including the client dump key;

start, by the trusted computer system, the dumper;

generate, by the dumper, an encrypted dump by encrypting, with the client dump key, an image to be dumped in the secure logical partition;

write, by the dumper, the encrypted dump on a client dump device;

wherein the protected area is in secure firmware of the trusted computer system, inaccessible by any program outside the secure firmware, inaccessible by an operating system, and inaccessible by a user;

wherein the client image key in the protected area is used to encrypt a boot image of a current operating system stored in the secure logical partition on the trusted computer system;

wherein the encrypted client dumper image key is generated, with a public host key, by a client computer;

wherein the encrypted dumper is generated, with the client dumper image key, by the client computer; and wherein the dumper is stored in an area of the secure logical partition which is reserved for the dumper.

* * * * *